(12) United States Patent
Schmierer et al.

(10) Patent No.: US 7,816,448 B2
(45) Date of Patent: Oct. 19, 2010

(54) HIGH SHEAR PRESSURE SENSITIVE ADHESIVE COMPOSITION

(75) Inventors: Jeffrey G. Schmierer, Centerville, MN (US); Mark S. Kroll, Arden Hills, MN (US); Richard A. Miller, White Bear Lake, MN (US)

(73) Assignee: H.B. Fuller Company, St. Paul, MN (US)

( * ) Notice: Subject to any disclaimer, the term of this patent is extended or adjusted under 35 U.S.C. 154(b) by 307 days.

(21) Appl. No.: 11/523,137

(22) Filed: Sep. 19, 2006

(65) Prior Publication Data

US 2008/0070053 A1   Mar. 20, 2008

(51) Int. Cl.
*C08L 53/02* (2006.01)
*B32B 27/04* (2006.01)

(52) U.S. Cl. .......... 525/89; 428/500; 428/512; 428/516; 428/517

(58) Field of Classification Search .......... 525/89; 428/500, 512, 516, 517
See application file for complete search history.

(56) References Cited

U.S. PATENT DOCUMENTS

| | | | |
|---|---|---|---|
| 4,526,577 A | 7/1985 | Schmidt et al. | |
| 4,944,993 A | 7/1990 | Raykovitz et al. | |
| 5,019,071 A | 5/1991 | Bany et al. | |
| 5,028,646 A | 7/1991 | Miller et al. | |
| 5,057,571 A | 10/1991 | Malcolm et al. | |
| 5,149,741 A | 9/1992 | Alper et al. | |
| 5,559,165 A * | 9/1996 | Paul | 523/111 |
| 6,232,391 B1 * | 5/2001 | Sambasivam et al. | 524/505 |
| 6,288,149 B1 | 9/2001 | Kroll | |
| 6,391,960 B1 | 5/2002 | Sambasivam et al. | |
| 6,531,544 B1 * | 3/2003 | Vaughan et al. | 525/89 |
| 2005/0176867 A1 | 8/2005 | He et al. | |

FOREIGN PATENT DOCUMENTS

WO   WO93/23488   11/1993

* cited by examiner

*Primary Examiner*—Jeffrey C Mullis

(57) ABSTRACT

A hot melt pressure sensitive adhesive composition includes ABA block copolymer(s), a midblock resin, a plasticizer, and optionally, an endblock resin. The A block is derived from styrene and B block is derived from butadiene or its hydrogenated version. The block copolymer(s) has an average styrene content of from about 15% to about 35%, an average diblock content of no less than about 20%, and an average solution viscosity of less than about 1,000 cps.

20 Claims, No Drawings

HIGH SHEAR PRESSURE SENSITIVE ADHESIVE COMPOSITION

FIELD OF THE INVENTION

The invention relates to a hot melt pressure sensitive adhesive composition including ABA block copolymer(s), a midblock resin, a plasticizer, and optionally an endblock resin.

BACKGROUND OF THE INVENTION

Hot melt pressure sensitive adhesives (HMPSAs) including a styrenic block copolymer (SBC) have been used for various applications, such as for tapes, labels, product assembly, and hook and loop applications. Due to the industry requirement for their shear adhesion performance, HMPSAs for these applications have traditionally contained styrene-isoprene-styrene (SIS) type block copolymers with high copolymer content. High copolymer content provides high shear adhesion performance, but also leads to high viscosity at application temperatures, and more recently, higher adhesive costs for SIS based HMPSAs.

It has been a challenge in the art to formulate a styrene-butadiene-styrene (SBS) block copolymer based HMPSA that has comparable performances relative to a similar SIS based HMPSA.

SBS block copolymers tend to have higher viscosities relative to the SIS block copolymers. Therefore, a SBS based HMPSA that has a high copolymer content to achieve the desirable high shear performance often exhibits even higher adhesive viscosity relative to that of a conventional SIS based HMPSA.

A high viscosity HMPSA is difficult to apply to substrates, especially at the high production rates preferred by the industry. Attempts to increase application temperatures can lead to the copolymer degradation and the decreased adhesive pot life, which reduces the ultimate adhesive performance, let alone the increased energy consumption, hazardous plant environment due to smoking and deformation of heat sensitive substrates. Using block copolymers with higher levels of styrene generally reduces the adhesive viscosities, but the HMPSAs are less flexible, and lower in tack properties. Specific adhesion attributes can also be affected. Using block copolymers with higher diblock content may also help to lower the adhesive viscosities but at the expense of greatly decreased cohesive strength, and thus, the reduction in shear adhesion performance. Liquid plasticizers are very efficient in lowering the viscosity of a HMPSA, but adversely affect the strength and shear performance.

Therefore, there is a need for a HMPSA including a styrene-butadiene-styrene (SBS) block copolymer that has not only high shear adhesion performance, but also a low viscosity suitable for applications at low temperatures such as a temperature of no greater than about 370° F.

SUMMARY OF THE INVENTION

In one aspect, the invention features a hot melt pressure sensitive adhesive composition that includes ABA block copolymer(s), a midblock resin, a plasticizer, and optionally an endblock resin. In the ABA configuration, A blocks refer to styrene; B block refers to butadiene or its hydrogenated version. The ABA block copolymer(s) has an average styrene content of from about 15% to about 35%, an average diblock content of no less than about 20%, and an average solution viscosity of less than about 1,000 cps.

In one embodiment, the block copolymer(s) has an average diblock content of no less than about 50%. In another embodiment, the block copolymer(s) has an average diblock content of no less than about 75%.

In some embodiments, the adhesive composition has a melt viscosity of no greater than about 30,000 cps at 350° F.

The adhesive composition of the invention can be formulated to exhibit well balanced properties such as good adhesion, low viscosity, and especially very high static shear adhesion. In one embodiment, the adhesive composition exhibits a static shear adhesion of at least 5 hours according to the specified static shear adhesion test method. In one embodiment, the adhesive composition exhibits a static shear adhesion of at least 10 hours according to the specified static shear adhesion test method.

In another aspect, the invention features an article that includes a substrate and an adhesive composition of the invention disposed on one surface of the substrate. The substrate can be chosen from polyolefin films such as polyethylene film, polypropylene film, PET film, woven or nonwoven polyolefin films, paper, foil, foam, vinyl, engineered wood, or the combinations thereof.

In one embodiment, the article is a fastening tape for disposable goods, e.g., disposable diapers, incontinent garments, etc.

In one embodiment, the article is a transfer tape.

In another aspect, the invention features a method of constructing an article that includes contacting a substrate with an adhesive composition of the invention.

In some embodiments, the adhesive composition is well suited to application at low temperatures, e.g., no greater than about 370° F.

Other features and advantages will be apparent from the following description of the preferred embodiments and from the claims.

DETAILED DESCRIPTION OF THE INVENTION

In reference to the invention, these terms have the meanings set forth below:

"ABA block copolymer(s)" ABA block copolymer(s) refers to one ABA block copolymer, or a blend of more than one ABA block copolymers. In the ABA block copolymer(s), A block is derived from styrene, and B block is derived from butadiene or its hydrogenated version. If more than one ABA block copolymers are used in the adhesive composition, each block copolymer will have different styrene content, different diblock content, and different solution viscosity.

"Styrene content" refers to the polystyrene content of an ABA block copolymer.

"Average styrene content" refers to the styrene content of ABA block copolymer(s) used in the adhesive composition, based on the total weight of the ABA copolymer(s) in the adhesive composition. If more than one ABA block copolymer(s) are used in the adhesive composition, the average styrene content is the average of the styrene content of the blend of the ABA block copolymer(s), based on the total weight of the blend of the ABA block copolymer(s). Average styrene content is calculated using the following formula:

Styrene %=(weight % of block copolymer A of the total styrene content)(styrene % of block copolymer A)+(weight % of block copolymer B of the total styrene content)(styrene % of block copolymer B)

For example, the average styrene content of a blend of 50% by weight of a block copolymer A (styrene content: 18%) and 50% by weight of a block copolymer B (styrene content: 28%) is calculated as follows:

$$\text{Styrene \%} = (0.5)(18\%) + (0.5)(28\%)$$

$$= (9\%) + (14\%) = 23\%$$

"Average diblock content" refers to the diblock content in the ABA block copolymer(s) used in the adhesive composition, based on the total weight of the ABA copolymer(s) in the adhesive composition. If more than one ABA block copolymer(s) are used in the adhesive composition, the average diblock content is the average of the diblock content of the blend of the ABA block copolymer(s), based on the total weight of the blend of the ABA block copolymer(s). Average diblock content is calculated in the same way as the above-described calculation for average styrene content.

"Solution viscosity" of an ABA block copolymer refers to the viscosity of the block copolymer at 25% in toluene solution at 25° C.

"Average solution viscosity" of ABA block copolymer(s) refers to the solution viscosity of the ABA block copolymer(s). If more than one ABA block copolymer(s) are used in the adhesive composition, the average solution viscosity is the combined solution viscosity of the ABA block copolymer(s) used in the adhesive composition.

The average solution viscosity is determined by measuring the solution viscosity of an ABA block copolymer, or the solution viscosity of a blend of more than one ABA block copolymer(s) in proportion.

For example, the average solution viscosity of a blend of 50% by weight of an ABA block copolymer A and 50% by weight of an ABA block copolymer B is determined by measuring the solution viscosity of the blend at 12.5% by weight of copolymer A and 12.5% by weight of copolymer B in toluene at 25° C.

Hot melt pressure sensitive adhesive composition of the invention includes from about 25% by weight to about 40% by weight of ABA block copolymer(s), based on the total weight of the adhesive composition. Useful ABA block copolymer(s) include various configurations e.g., linear triblock, radial, branched, and tapered geometries. The A blocks are derived from styrene, which is known as an endblock. The B block is derived from butadiene, or its hydrogenated version, i.e., ethylene-butylene, which is known as a midblock.

Suitable ABA block copolymer(s) have an average styrene content of at least about 15%, or at least about 20%, or no greater than about 35%, based on the weight of the copolymer(s).

Suitable ABA block copolymer(s) also have an average diblock content of at least about 20% and up to about 90%, based on the weight of the copolymer(s).

Suitable ABA block copolymer(s) also have an average solution viscosity of less than about 1,000 cps.

Examples of commercially available useful ABA block copolymer(s) include KRATON D 1116 (SBS, 23% styrene, 16% diblock, 9,000 cps solution viscosity), D 1118K (SBS, 33% styrene, 80% diblock, 630 cps solution viscosity), D 1153 (SBS, 29% styrene, less than 1% diblock, 1,650 cps solution viscosity), D 1102 (SBS, 28% styrene, 17% diblock, 1,100 cps solution viscosity), KRATON G 1726 (SEBS, 30% styrene, 70% diblock, 200 cps solution viscosity), G 1652 (SEBS, 30% styrene, less than 1% diblock, 1,800 cps solution viscosity), and G 1657 (SEBS, 13% styrene, 29% diblock, 4,200 cps solution viscosity) from Kraton Polymer (Houston, Tex.), SOLPRENE S-1205 (SBS, 25% styrene (17.7% polystyrene), 89% diblock), S-4318 (SBS, 33% styrene, 78% diblock, 840 cps solution viscosity) from Dynasol (Houston, Tex.), and VECTOR 6241 (SBS, 43% styrene, less than 1% diblock, 850 cps solution viscosity) from Exxon (Houston, Tex.).

The adhesive composition includes from about 40% by weight to about 60% by weight of a midblock resin based on the total weight of the adhesive composition. Midblock resin refers to a tackifying resin that is compatible with the midblock of the ABA block copolymer(s).

Useful midblock resins include, e.g., any compatible hydrocarbon resin, synthetic polyterpene, rosin esters, natural terpenes, and the like. More particularly, and depending upon the particular base polymer, useful midblock resins include (1) natural and modified rosins; (2) glycerol and pentaerythritol esters of natural and modified rosins; (3) copolymers and terpolymers of natural terpenes; (4) polyterpene resins having a softening point, as determined by ASTM method E28, of 80° C. to 150° C.; (5) phenolic modified terpene resins and hydrogenated derivatives thereof; (6) aliphatic petroleum hydrocarbon resins having a softening point of 70° C. to 135° C.; (7) alicyclic petroleum hydrocarbon resins and the hydrogenated derivatives thereof; (8) aromatic/aliphatic or alicyclic hydrocarbon resins such as those sold under the trademarks ECR 149B and ECR 179A by Exxon Chemical Company; and combinations thereof. Especially useful midblock resins include those that have a softening point of from about 100° C. to about 140° C. Tackifying resins disclosed in U.S. Pat. No. 6,288,149, which is incorporated by reference in its entirety, may also be useful.

Examples of useful commercially available midblock resins include ESCOREZ 2596, ESCOREZ 5400, ESCOREZ 5600, ESCOREZ 5615, and ESCOREZ 5637 from Exxon Chemical (Houston, Tex.), ZONATAC 105LT from Arizona Chemical (Jacksonville, Fla.), and EASTOTAC H-130R aliphatic tackifying resins available from Eastman Chemical (Kingsport, Tenn.).

The adhesive composition includes from about 8% by weight to about 13% by weight, or up to about 20% by weight, of a plasticizer, based on the total weight of the adhesive composition.

Useful plasticizers include those that are liquid at ambient temperature, also known as liquid plasticizers, such as plasticizing oils. In the context of the present invention a liquid plasticizer is also defined as a diluent that is flowable at ambient temperature and that has a weight average molecular weight (Mw) of less than 3,000, or less than 2,000, or even less than 1,000. Suitable plasticizing oils are primarily hydrocarbon oils low in aromatic content. Preferably, the oils are paraffinic or naphthenic in character. The oils are preferably clear, low in volatility and have as little color and odor as possible. The use of plasticizing oils in the present invention also contemplates the use of olefin oligomers, low molecular weight polymers, vegetable oils and their derivatives and similar plasticizing liquids.

Examples of commercially available plasticizers include KAYDOL 35 from Witco Corporation (Greenwich Conn.), CALSOL 5 series from Calumet Lubricants Company (Indianapolis, Ind.), NYFLEX 222b (500 vis. process oil) from Nynas (Houston, Tex.).

The adhesive composition may include up to about 12% by weight of an endblock resin. In some embodiment, the adhesive composition includes from about 3% by weight, or about 4% by weight, up to about 10% by weight, or up to about 12% by weight of an endblock resin, based on the total weight of the adhesive composition.

Endblock resin refers to a tackifying resin that is compatible with the endblocks of the ABA block copolymer(s). Useful endblock resins include the higher softening point pure aromatic monomer resins, e.g. those that have a softening point of no less than about 140° C. Examples of the endblock resins suitable for use, e.g., in the fastening tapes include low molecular weight polymers of styrene and alpha-methylstyrene as well as copolymers of these, coumarone-indenes, polyindenes, and other resins containing mono or polycyclic aromatic groups.

Examples of commercially available suitable end block resins include PLASTOLYN 290, KRISTALEX 1120 and 5140, ENDEX 155 and 160, available from Eastman Chemical Company; SYLVARES SA 140 from Arizona Chemical.

The adhesive composition may also include other optional components such as antioxidants, fillers, pigments, dyestuffs, processing aids, crosslinking agents, heat stabilizers, ultraviolet stabilizers, polypropylene polymers including homopolymers, copolymers and terpolymers, or the combinations thereof.

The adhesive composition can be formulated to have a viscosity such that it can be applied using various conventional hot melt application methods and/or processing equipments at application temperatures e.g., no greater than about 370° F. In some embodiments, the adhesive composition has a melt viscosity of no greater than about 30,000 centipoises (cps) at about 350° F. In some embodiments, the adhesive composition has a melt viscosity of no greater than about 25,000 cps at about 350° F. In other embodiments, the adhesive composition has a melt viscosity of no greater than about 15,000 cps at about 350° F.

The adhesive composition can be prepared by blending the components in the melt at a temperature of from about 300° F. to about 350° F. until a homogeneous blend is obtained. Various blending methods are known in the art and any method that could produce a homogeneous blend would be suitable.

The adhesive composition is suitable for bonding various substrates using any suitable conventional application techniques such as spraying, coating, laminating, melt blown, or combinations thereof.

Suitable substrates include polyolefin films such as polyethylene, polypropylene, polyethylene terephthalate (PET), or polyester films, woven or nonwoven polyolefins, paper, foam, vinyl, foil, chipboard, engineered wood, or combinations thereof.

In another aspect, the invention features an article including at least one substrate and a hot melt pressure sensitive adhesive composition of the invention disposed on one surface of the substrate. Examples of the article include a disposable article e.g., disposable diapers, feminine protection articles, incontinent pads, bed pads, surgical drapes and gowns, and the like. Other examples of the article include carton, case, tray, box closure, etc.

The invention will now be described by way of the following examples. The amounts indicated are in percent by weight unless otherwise indicated.

EXAMPLES

Test Procedures

Test procedures used in the examples include the following.

Brookfield Thermocel Melt Viscosity

Thermocel melt viscosity of a hot melt pressure sensitive adhesive is tested at 10 RPM and a test temperature (° F.) using a Brookfield viscometer.

Solution Viscosity

Solution viscosity of an ABA block copolymer is measured using 25% neat block copolymer in toluene at 25° C.

Static Shear Adhesion

Static shear adhesion of a hot melt pressure sensitive adhesive is tested according to the Harmonized International Standard test method PSTC 107 "Shear Adhesion of Pressure Sensitive Tape", Procedure A, with the following modifications from the method:

Test tape is made by coating a hot melt pressure sensitive adhesive onto a two (2) mil polyethylene terephthalate (PET) film. The dwell time is one (1) hour. Test specimen size is ½ inch by ½ inch. Test temperature is 40° C.

Examples 1-7

Each of Examples 1-7 is prepared by combining and melting the ingredients in the amounts (% by weight) specified in Table I at about 300° F. Various properties are then tested according to the test methods described above. The results are also reported in Table I. As shown, the adhesive compositions exhibit the ability to increase the shear holding power significantly without a correlating increase in melt viscosity.

TABLE I

| | % RM | | | | | | |
|---|---|---|---|---|---|---|---|
| | Ex. 1 | Ex. 2 | Ex. 3 | Ex. 4 | Ex. 5 | Ex. 6 | Ex. 7 |
| PLASTOLYN 290 (endblock resin) | | 4 | 7 | 10 | 13 | 7 | 7 |
| ESCOREZ 5615 (midblock resin) | 55 | 51 | 48 | 45 | 42 | 48 | 43.8 |
| IRGANOX 1010 (antioxidant) | 0.2 | 0.2 | 0.2 | 0.2 | 0.2 | 0.2 | 0.2 |
| IRGANOX 1726 (antioxidant) | 0.8 | 0.8 | 0.8 | 0.8 | 0.8 | 0.8 | 0.8 |
| KRATON D-1118K (SBS) | 33 | 33 | 33 | 33 | 33 | 31 | 35 |
| 500 vis. | 11 | 11 | 11 | 11 | 11 | 13 | 11 |

TABLE I-continued

| | % RM | | | | | | |
|---|---|---|---|---|---|---|---|
| | Ex. 1 | Ex. 2 | Ex. 3 | Ex. 4 | Ex. 5 | Ex. 6 | Ex. 7 |
| process oil | | | | | | | |
| Viscosity at 300° F. (cps) | 34,600 | 37,800 | 45,600 | 47,700 | 53,000 | 29,000 | 48,000 |
| Viscosity at 350° F. (cps) | 11,400 | 12,275 | 13,525 | 13,800 | 14,625 | 9,600 | 15,600 |
| T (g) (° C.) | 19.8 | 20.8 | 19.8 | 20.3 | 17.3 | 6.8 | 6.9 |
| G' at 25° C. (dynes/cm$^2$) | $1.8 \times 10^6$ | $2.6 \times 10^6$ | $1.8 \times 10^7$ | $4.1 \times 10^6$ | $1.0 \times 10^7$ | $1.2 \times 10^6$ | $1.9 \times 10^6$ |
| Coat Weight (gsm) | 61-63 | 59-62 | 59-63 | 63-66 | 57-59 | 58-60 | 58-60 |
| Static Shear (hr) | 8.4 | 19.6 | 29.2 | 51.4 | 53.2 | 11.3 | 14.6 |

Examples 8-12

Each of Examples 8-12 is prepared by combining and melting the ingredients in the amounts (% by weight) specified in Table II at about 300° F. Various properties are then tested according to the test methods described above. The results are also reported in Table II. As shown, the adhesive compositions including a blend of ABA block copolymers also exhibit improved shear adhesion and low melt viscosities.

TABLE II

| | % RM | | | | |
|---|---|---|---|---|---|
| | Ex. 8 | Ex. 9 | Ex. 10 | Ex. 11 | Ex. 12 |
| PLASTOLYN 290 | | 4 | 7 | 10 | 13 |
| ESCORTEZ 5615 | 55 | 51 | 48 | 45 | 42 |
| IRGANOX 1010 | 0.2 | 0.2 | 0.2 | 0.2 | 0.2 |
| IRGANOX 1726 | 0.8 | 0.8 | 0.8 | 0.8 | 0.8 |
| KRATON D-1116 (SBS) | 5 | 5 | 5 | 5 | 5 |
| KRATON D-1118K | 28 | 28 | 28 | 28 | 28 |
| 500 vis. process oil | 11 | 11 | 11 | 11 | 11 |
| Viscosity at 300° F. (cps) | 50,750 | 62,400 | 70,625 | 75,250 | 90,000 |
| Viscosity at 350° F. (cps) | 16,950 | 19,950 | 21,750 | 22,000 | 24,800 |
| T (g) (° C.) | 22.8 | 19.8 | 19.8 | 16.8 | 2 Phase |
| G' at 25° C. (dynes/cm$^2$) | $2.4 \times 10^6$ | $2.8 \times 10^6$ | $3.1 \times 10^6$ | $6.2 \times 10^6$ | $1.6 \times 10^7$ |
| Coat Weight (gsm) | 65-70 | 61-66 | 63-66 | 62-63 | 59-63 |
| Static Shear (hr.) | 14.2 | 41.4 | 95.7 | 193.4 | 260+ |

Comparative Examples 1-3

Comparative Examples 1-3 are commercially available hot melt pressure sensitive adhesive compositions, each using a SIS block copolymer. Melt viscosity and static shear adhesion of each adhesive composition are tested according to the test methods described above. The results are reported in Table III. The adhesive compositions exhibit either high shear performance but also high melt viscosity, or acceptable melt viscosities but poor shear performance.

TABLE III

| | Comp. Ex. 1* | Comp. Ex. 2** | Comp. Ex. 3*** |
|---|---|---|---|
| Viscosity at 300° F. (cps) | 143,000 | 60,000 | 117,500 |
| Viscosity at 350° F. (cps) | 39,000 | 11,000 | 14,000 |
| Static Shear (hr.) | 48+ | 1 | 1.2 |

*Bostik H2491F01-IJ available from Bostik, Inc. (Wauwatosa, WI)
**HM-2713F available from H.B. Fuller (St. Paul, MN)
***HL-2081 available from H.B. Fuller (St. Paul, MN)

Examples 13-14 and Comparative Examples 4-6

Each of Examples 13-14 and Comparative Examples 4-6 is prepared by combining and melting the ingredients in the amounts (% by weight) specified in Table IV at about 300° F. Various properties are then tested according to the test methods described above. The results are reported in Table IV. The comparative examples exhibit either high shear performance but also high melt viscosity, or acceptable melt viscosities but poor shear performance.

TABLE IV

| | % RM | | | | |
|---|---|---|---|---|---|
| | Comp. Ex. 4 | Comp. Ex. 5 | Comp. Ex. 6 | Ex. 13 | Ex. 14 |
| PLASTOLYN 290 | 7 | 6 | 7.5 | 6 | 7 |
| ESCORTEZ 5600 | | 45 | | | |
| ESCOREZ 5615 | | | 47.1 | | 44 |
| ESCOREZ 5637 | | | | 45 | |
| IRGANOX 1010 | 0.2 | 0.5 | 0.5 | | 0.2 |
| IRGANOX 1076 | 0.8 | 0.5 | 0.5 | 0.2 | |
| IRGANOX 1726 | | | | 0.8 | 0.8 |
| KRATON D1102 | 35 | | | | |
| KRATON D1117 | | 33 | | | |
| Solprene S4318 (SBS) | | | | | 35 |
| KRATON G1657 | | | 30.5 | | |
| KRATON G1726 | | | | 33 | |
| 500 vis. process oil | 11 | 15 | 13.9 | 15 | 11 |
| RM-6327 (Coextrudant Coating for pillows) | | | | | 2 |
| Viscosity at 350° F. (cps) | 23,000 | 7,800 | 45,200 | 3250 | 24,500 |
| T (g) (° C.) | 9.8 | 8.0 | 10 | 21 | 10.8 |
| G' at 25° C. (dynes/cm$^2$) | $2.6 \times 10^6$ | $4.96 \times 10^5$ | $4.37 \times 10^6$ | $7.61 \times 10^6$ | $4.9 \times 10^6$ |
| Coat Weight (gsm) | 60 | 60 | 60-62 | 60 | 57-59 |
| Static Shear (Hr.) | 4.4 | 1.7 | 35.8 | 35.8 | 27.4 |

Example 15

Example 15 is prepared by combining and melting the ingredients in the amounts (% by weight) specified in Table V at about 300° F. Various properties are then tested according to the test methods described above. The results are reported in Table V. It is shown that a polypropylene polymer can be used to substitute for a portion of the ABA block copolymer.

TABLE V

| % RM | Ex. 15 |
|---|---|
| Plastolyn 290 | 7 |
| ESCOREZ 5615 | 41 |
| IRGANOX 1010 | 0.2 |
| IRGANOX 1726 | 0.8 |
| KRATON D1118K | 35 |
| 500 vis. process oil | 11 |
| Licocene 6102 (polypropylene polymer) | 5 |
| Viscosity at 350° F. (cps) | 20,250 |
| T(g) (° C.) | 7.9 |
| G' at 25° C. (dynes/cm$^2$) | $3.6 \times 10^6$ |
| Static Shear (hr.) | 7.6 |

While numerous embodiments and examples have been disclosed herein, it should be apparent that modifications could be made without departing from the spirit and scope of the invention. Therefore, the appended claims are intended to cover all such modifications that are within the scope of this invention.

What is claimed are:

1. A hot melt pressure sensitive adhesive composition comprising:

ABA block copolymer(s), said A block being styrene and said B block being butadiene or the hydrogenated version thereof, said block copolymer(s) having an average styrene content of from about 15% to 35%, an average diblock content of no less than about 20%, and an average solution viscosity of less than 1,000 cps when tested at 25° C. in a 25 weight % solution of toluene;

a midblock resin;

a plasticizer; and an end block resin, wherein said adhesive has a melt viscosity of no greater than about 30,000 cps at 350° F., and wherein said adhesive exhibits static shear adhesion of at least about 5 hours at 40° C.

2. The hot melt adhesive composition of claim 1, wherein said end block resin has a softening point of no less than about 140° C.

3. The hot melt adhesive composition of claim 1, wherein said midblock resin has a softening point of from about 100° C. to about 140° C.

4. The hot melt adhesive composition of claim 1, wherein said composition comprises from about 25% to about 40% by weight of said block copolymer(s).

5. The hot melt adhesive composition of claim 1, wherein said composition comprises from about 3% to about 12% by weight of said end block resin.

6. The hot melt adhesive composition of claim 1, wherein said composition comprises from about 40% to about 60% by weight of said midblock resin.

7. The hot melt adhesive composition of claim 1, wherein said plasticizer is liquid plasticizer.

8. The hot melt adhesive composition of claim 1, wherein said composition comprises from about 8% to about 20% by weight of said plasticizer.

9. The hot melt adhesive composition of claim 1, wherein said adhesive composition exhibits static shear adhesion of at least about 10 hours at 40° C.

10. The hot melt adhesive composition of claim 1, further comprising a polypropylene polymer.

11. The hot melt adhesive composition of claim 1, wherein said adhesive has a melt viscosity of no greater than about 25,000 cps at 350° F.

12. The hot melt adhesive composition of claim 1, wherein said adhesive has a melt viscosity of no greater than about 15,000 cps at 350° F.

13. An article comprising:
 a substrate; and
 a hot melt adhesive composition of claim 1 disposed on said substrate.

14. The article of claim 13, wherein said substrate is chosen from polyethylene, polypropylene, polyethylene tetraphthalate, woven or nonwoven polyolefins, paper, foam, vinyl, foil, chip board, engineered wood, or the combinations thereof.

15. The article of claim 13, wherein said article is a fastening tape for a disposable article.

16. The article of claim 13, wherein said article comprises diapers, and incontinence garments.

17. The article of claim 13, wherein said article comprises transfer tapes, box closure, and carton sealing.

18. A method of constructing the article of claim 13, comprising contacting said substrate with said adhesive composition.

19. The hot melt adhesive composition of claim 1, wherein said composition has an average diblock content of no less than about 75%.

20. A hot melt pressure sensitive adhesive composition comprising:
 ABA block copolymer(s), said A block being styrene and said B block being butadiene or the hydrogenated version thereof, said block copolymer(s) having an average styrene content of from about 15% to about 35%, an average diblock content of no less than about 50%, and an average solution viscosity of less than 1,000 cps when tested at 25° C. in a 25 weight % solution of toluene;
 a midblock resin;
 a plasticizer; and
 an end block resin,
wherein said adhesive has a melt viscosity of no greater than about 30,000 cps at 350° F., and wherein said adhesive exhibits static shear adhesion of at least about 5 hours at 40° C.

* * * * *